United States Patent [19]

Giesl-Gieslingen et al.

[11] Patent Number: 4,632,445
[45] Date of Patent: Dec. 30, 1986

[54] COOLING DEVICE FOR RAILWAY WHEELS

[75] Inventors: Adolph Giesl-Gieslingen, Vienna, Austria; Harry G. Jackson, Wauwatosa, Wis.

[73] Assignee: Harry G. Jackson, Jr., Wauwatosa, Wis.

[21] Appl. No.: 786,678

[22] Filed: Oct. 11, 1985

[51] Int. Cl.[4] .............................................. B60B 17/00
[52] U.S. Cl. .......................................... 295/1; 295/21
[58] Field of Search .................. 295/1, 7, 28, 8, 21, 295/27; 301/6 CS, 6 WB, 37 R

[56] References Cited

U.S. PATENT DOCUMENTS

| | | | |
|---|---|---|---|
| 228,430 | 6/1880 | Woodbury | 295/7 |
| 2,242,855 | 5/1941 | Flowers | 295/28 |
| 2,382,550 | 8/1945 | Eksergian | 295/1 |
| 3,043,630 | 7/1962 | Hertzman | 301/6 CS |
| 3,623,774 | 11/1971 | Funke | 301/6 CS |

FOREIGN PATENT DOCUMENTS 859224 12/1940 France .................... 295/1

Primary Examiner—Robert B. Reeves
Assistant Examiner—Dennis C. Rodgers
Attorney, Agent, or Firm—Quarles & Brady

[57] ABSTRACT

A cooling device especially adapted to be applied to railway car wheels that are subjected to heating by the application of braking pressure to the rims. The cooling structure is suitable for mounting on existing wheels as well as on new wheels. It comprises a plurality of vanes extending radially from the hub of the wheel to its rim in spaced relationship. An annular cover is attached to the outer edges of the vanes to form a plurality of channels that have an opening at the hub end and another opening at the rim end. As the wheel rotates an air stream is formed in each of the channels with the air entering the channel at the hub opening, and exhausting at the rim opening so that the air impinges on the rim to carry away the heat from the rim.

11 Claims, 2 Drawing Figures

COOLING DEVICE FOR RAILWAY WHEELS

BACKGROUND OF THE INVENTION

The invention pertains generally to railway car wheels and more particularly to a railway car wheel structure especially adapted to dissipate the heat generated by braking action applied to the periphery of the rim of the wheel.

Many railway cars are provided with brake blocks that are applied to the periphery of the rim of the wheels for the purpose of producing a braking action to reduce the running speed of the car and bring it eventually to a standstill or to prevent it from overspeeding when running downhill. During such brake applications heat is generated by the friction of the brake block rubbing against the surface of the rim so that the temperature of the wheel rises substantially with the maximum temperature developing in the rim of the wheel where the braking force is applied.

The wheel is therefore subjected to changing temperature gradients which create internal stresses. These stresses reach such magnitude that they cause fissures to develop that eventually result in wheel failure and possible derailment of the car.

The detrimental affect of the heat generated by the braking action in railway car wheels is recognized in U.S. Pat. No. 4,281,745 issued to Xaver Wirth on Aug. 4, 1981 in which FIG. 6 illustrates ribs secured to the brake discs for cooling the brake itself. However, none of the prior art suggests a practical cooling structure for cooling the rim of a railway car wheel that is braked by the application of brake blocks or shoes to the rim of the wheel and therefore has no brake discs on which ribs can be mounted.

SUMMARY OF THE INVENTION

The cooling device of the present invention comprises a plurality of vanes extending radially between the hub of the wheel and its rim. One longitudinal edge of each of the vanes is adjacent to the wheel plate which couples the rim of the wheel to its hub. The vanes extend outwardly from the wheel plate an equal amount and an annular cover plate extends about the wheel and is secured to the outer edges of the vanes to form channels between the vanes. The cover plate is of such a dimension as to leave an opening in the channels adjacent to the hub and another opening at the opposite end adjacent to the rim.

Each of the several channels is therefore open at both ends, and as the wheel rotates the centrifugal forces cause a strong current of air to flow through the channels with the channel opening at the hub serving as an inlet and the opening at the rim serving as an exhaust. As a result, the air flowing through the channels is directed onto the rim of the wheel from where it is exhausted into the atmosphere to efficiently dissipate the heat generated in the rim by the braking action.

To further improve the efficiency of the unit, insulators may be applied to form the inner side of the channels to prevent the temperature of the air flowing through the channels from being raised by the heat that may be conducted to the wheel plate. This assures that the temperature of the air impinging on the rim of the wheel is at a minimum.

Accordingly, it is a general object of the present invention to provide a cooling structure for railway car wheels especially adapted to direct cooling air onto the rim of a wheel which is subjected to the braking action of a brake block forced against the periphery of the rim of the wheel.

Figure 1:
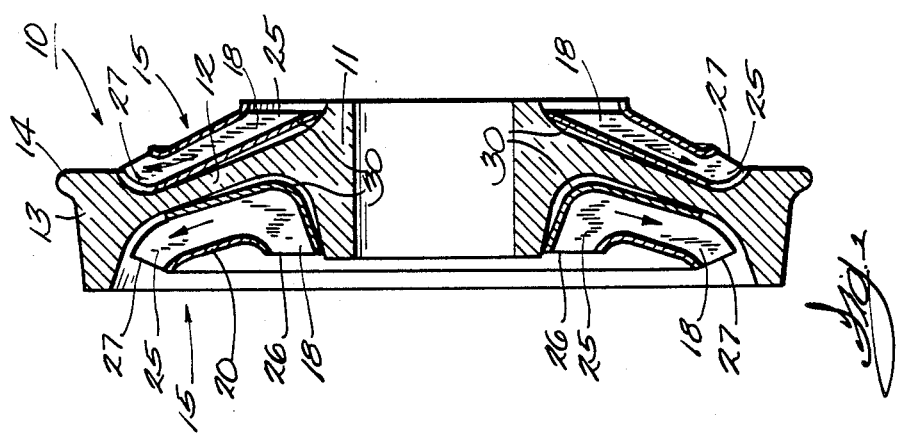
FIG. 1 is a cross-sectional view taken through the center of a railway car wheel equipped with the improved cooling structure of the present invention.

Reference is now made more particularly to the drawing and specifically to FIG. 1 thereof which illustrates a railway car wheel incorporating the features of the present invention. The railway car wheel generally identified by the reference numeral 10 is of conventional construction and comprises a hub 11 with an annular wheel plate 12 extending radially from the hub 11 and secured at its opposite edge to a rim 13. The rim 13 includes a flange 14 that cooperates with the flange on the opposite wheel of the wheel set for confining the wheel set within the track gauge in well known manner.

The cooling structure of the present invention is generally identified by the reference numeral 15. In the illustrated embodiment a separate cooling structure 15 is shown applied to each side of the wheel 10 for producing a maximum cooling effect on the rim 13. However, it should be understood that the cooling structure may be applied to one side of the wheel only which may produce adequate cooling under certain conditions. Moreover, the two cooling structures 15 are identical except for the shape of the parts which accommodate the configuration of the wheel that is different on each side so that the description of one will also apply to the other.

Figure 2:
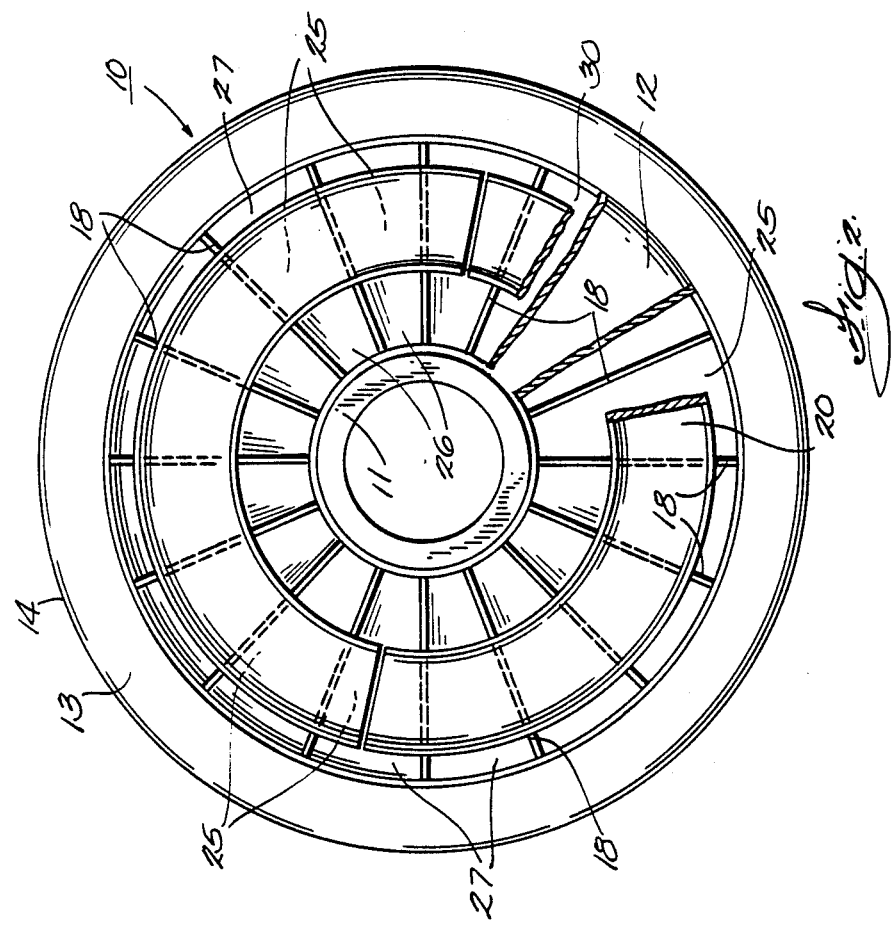
FIG. 2 is an elevational view of the railway car wheel illustrated in FIG. 1 with portions broken away.

The cooling structure 15 comprises a plurality of vanes 18 that extend radially from the hub 11 to the rim 13 in equally spaced relationship. All of the vanes 18 are secured to an annular cover plate 20 to form a unitary structure which may be attached to the wheel 10. The cooling structure may be formed of plastic and cemented to the wheel. However, other materials may be employed in fabricating the unit and other means of attachment may be employed. It may be found convenient to split the annular cover 20 in half as shown in FIG. 2 so that each unit will comprise two separate halves for application to the wheel. Such arrangement would facilitate the mounting of the cooling apparatus to wheels that are on a wheel set mounted on a railway car.

The spaces between the vanes 18 and the annular cover 20 serve to form channels 25 between them for developing air streams. To this end, an opening 26 is provided at the end of each channel 25 adjacent to the hub 11 to serve as an inlet for air which is exhausted through an opening 27 formed at the end of each channel 25 adjacent to the rim 13.

With this arrangement, the rotation of the wheel 10 will generate centrifugal forces that will develop air streams in the channels 25 that flow in the direction of the arrows shown in FIG. 1. As a result, the air will enter the channels 25 through the openings 26 and flow therethrough and exhaust through the opening 27 to impinge against the rim 13. The flow of air through the channels 25 is quite rapid. Even at the moderate speed of 50 mph, a 36" diameter wheel will make 7.8 revolutions per second, and will impart to the air impelled through the channels 25 a very high velocity and correspondingly high coefficients of heat transfer for cooling.

Moreover, the channels 25 are designed so that their depths, crosswise of the wheel, as viewed in FIG. 1, gradually decrease toward the exhaust opening 27 to reduce the crosssectional area of the channels as much as possible toward the exhaust opening 27. This serves to increase the outlet velocity of the air to intensify the cooling effect on the rim.

The annular covers 20 serve the double purpose of functioning as structural members to hold the vanes in place and also form the closed channels to prevent outside air from mixing with and disturbing the guided air streams within the channels which would reduce the cooling effect.

The wheel plate 12 is formed of metal so that it is conductive. Therefore, heat from the rim 13 as well as from the hub 11 may be conducted into the wheel plate 12 to elevate its temperature. The temperature in this area however is not high enough to render it critical, and in order to avoid this heat from being transferred to the air flowing through the channels 25, an insulator 30 is secured between the vanes 18 and the wheel plate 12 as shown. The insulator 30 may be of any type of insulating material, such as a foam plastic which would be cemented to the vanes 18, or, if preferred, to the surface of the wheel plate 12 and extends from the inlet opening 26 but terminates where the wheel plate joins the wheel rim. Thus the rim is exposed to the stream of air flowing through the outlet 27.

The presence of the insulators 30 will interfere with the transfer of heat from the wheel plate 12 to the air flowing through the passages 25 so that the air impinging upon the rim 13 is retained at a minimum temperature for improved cooling efficiency. Moreover, to improve the cooling efficiency of the unit, the insulators 30 may be spaced slightly from the wheel plate 12 to form a dead air space between them. This dead air space will further impede the transfer of head from the wheel plate to the air flowing in the channels 25. It is found that the high temperature developed in the rim 13 by the braking pressure applied to its periphery causes deterioration of the wheel in this area, and eventual failure. For this reason it is desirable to obtain maximum cooling effect on the rim 13 for promoting long wheel life.

From the foregoing detailed description of the illustrative embodiment set forth herein to exemplify the present invention, it will be apparent that there has been provided an improved cooling device structure for use on railway car wheels that are braked by brake blocks applied to the periphery of the wheel rims for stopping the car. The cooling device is of simple construction but very efficient in operation to apply a cooling effect directly on the rim of the railway car wheel where excessive heat may be generated.

Although the illustrative embodiment of the invention has been described in considerable detail for the purpose of disclosing a practical operative structure whereby the invention may be practiced advantageously, it is to be understood that the apparatus described is intended to be illustrative only, and that the novel characteristics of the invention may be incorporated in other structural forms without departing from the spirit and scope of the invention as defined in the subjoined claims.

The principles of this invention having now been fully explained in connection with the foregoing description, I hereby claim as my invention:

1. A cooling apparatus for attachment to railway car wheels having an annular wheel plate with a hub attached to the inner diameter of said wheel plate and a rim secured to its outer diameter and wherein the wheel is stopped by forcing a brake block against the rim of the wheel to produce the braking action; a plurality of vanes extending radially along the face of the wheel plate between the hub and the rim, each vane having an inner edge adjacent to the face of the wheel plate and extending therefrom to present an outer edge that is displaced from the wheel plate; the improvement comprising an annular cover plate extending about said wheel plate and abutting the outer edges of the vanes to form fully enclosed passages between the vanes with the inner diameter of said annular cover plate being spaced from the hub of the wheel to form a first opening for each channel at the hub of the wheel and its outer diameter being spaced from the rim of the wheel to form a second opening adjacent to the rim of the wheel with all of such openings extending along the entire space between the vanes so that rotation of the wheel will produce an unimpeded air stream flowing without interference through each of said passages with the air entering the passage at the opening adjacent to the hub and exhausting from the opening adjacent to the rim after it impinges upon the rim at the end of the passage to carry heat away from the rim.

2. A cooling apparatus according to claim 1 applied to each side of the wheel to increase the cooling effect.

3. A cooling apparatus according to claim 1 including means attaching said vanes to said annular cover plate to form a unitary structure for application as a complete assembly to a railway car wheel.

4. A cooling apparatus according to claim 3 wherein said annular cover plate is divided into two parts along an axial plane so that the complete unit is divided into two halves to facilitate installation on wheels that are mounted on a railway car.

5. A cooling apparatus according to claim 3 including an insulator defining the inner side of the channels adjacent to said wheel plate for preventing the transmission of heat from the wheel plate to the air stream flowing through the channel.

6. A cooling apparatus according to claim 5 wherein said insulator is spaced from the wheel plate to form a dead air space between the insulator and the wheel plate to further impede the transmission of heat from the wheel plate to the air flowing through the channel.

7. A cooling apparatus according to claim 5 wherein said heat insulator terminates where the wheel plate joins the wheel rim.

8. A cooling apparatus according to claim 1 wherein the crosswise width of the air channels is reduced toward their second opening, for the purpose of increasing the outlet velocity of the air and further intensifying the cooling effect on the rim.

9. A cooling apparatus for attachment to railway car wheels having an annular wheel plate with a hub attached to the inner diameter of said wheel plate and a rim secured to its outer diameter, said rim having a tread for engagement with the tracks upon which the wheels roll and wherein the wheel is stopped by forcing a brake block against the tread of the wheel to produce the braking action; a plurality of vanes extending radially along the face of the wheel plate between the hub and the rim, each vane having an inner edge adjacent to the face of the wheel plate and extending therefrom to present an outer edge that is displaced from the wheel plate; the improvement comprising an annular cover plate extending about said wheel plate and abutting the outer edges of the vanes to form fully enclosed passages between the vanes with each passage having an opening adjacent to the hub of the wheel and a second opening adjacent to the rim of the wheel so that rotation of the wheel will produce an air stream flowing through each of said passages with the air entering the passage at the opening adjacent to the hub and exhausts from the opening adjacent to the rim and impinges upon the rim as it leaves the passage to carry heat away from the rim; an insulator defining the inner side of the passages for preventing the transmission of heat from the wheel plate to the air stream flowing through the passage, said insulator being spaced from the wheel plate to further impede the transmission of heat from the wheel plate to the air flowing through the passage.

10. A cooling apparatus according to claim 9 including means attaching said vanes to said annular cover plate to form a unitary structure for application as a complete assembly to a railway car wheel.

11. A cooling apparatus according to claim 9 wherein the crosswise width of the enclosed air passages are reduced toward their second openings, for the purpose of increasing the outlet velocity of the air and further intensifying the cooling effect on the rim.

* * * * *